United States Patent [19]
Kobayashi

[11] Patent Number: 5,781,321
[45] Date of Patent: Jul. 14, 1998

[54] PORTABLE ELECTRONIC APPARATUS HAVING A PLURALITY OF INFRARED PORTS

[75] Inventor: Fumiyuki Kobayashi, Tokyo, Japan

[73] Assignee: NEC Corporation, Japan

[21] Appl. No.: 608,597

[22] Filed: Feb. 29, 1996

[30] Foreign Application Priority Data

Mar. 2, 1995 [JP] Japan .................. 7-043164

[51] Int. Cl.[6] .................................. H04B 10/00
[52] U.S. Cl. .................. 359/143; 359/152; 359/163
[58] Field of Search .................. 359/142, 143, 359/144, 145, 146, 147, 148, 152, 172, 163

[56] References Cited

U.S. PATENT DOCUMENTS

| | | |
|---|---|---|
| 4,718,112 | 1/1988 | Shinoda .................. 359/148 |
| 4,856,090 | 8/1989 | Kitani et al. . |
| 5,307,297 | 4/1994 | Iguchi et al. . |
| 5,343,319 | 8/1994 | Moore .................. 359/152 |
| 5,359,448 | 10/1994 | Laszlo et al. . |
| 5,446,783 | 8/1995 | May .................. 379/59 |
| 5,553,314 | 9/1996 | Grabe et al. .................. 455/54.2 |
| 5,636,264 | 6/1997 | Sulavuori et al. .................. 379/56 |

*Primary Examiner*—Rafael Bacares
*Attorney, Agent, or Firm*—Ostrolenk, Faber, Gerb & Soffen, LLP

[57] ABSTRACT

A portable electronic apparatus is provided with a plurality of infrared element connectors on the housing surfaces thereof. A detachable infrared emitting/receiving element is electrically connected to one selected from the infrared element connectors which is directed toward the opposite apparatus so as to provide the desired infrared connection. This causes the infrared transmission to be made without changing the direction of the apparatuses.

10 Claims, 4 Drawing Sheets

PORTABLE ELECTRONIC APPARATUS HAVING A PLURALITY OF INFRARED PORTS

BACKGROUND OF THE INVENTION

1. Field of the Invention

The present invention generally relates to portable electronic apparatuses including a portable calculator, a mobile information processing terminal and a notebook-size computer, and in particular to a portable electronic apparatus having an infrared communication function.

2. Description of the Related Art

Recently, the infrared communication function has been provided in an increasingly number of portable electronic apparatuses. Using infrared components which are relatively inexpensive, wireless data communications can easily be implemented between sender and receiver or between each of these and a common target over a relatively small area.

As shown in FIG. 1, respective portable electronic apparatuses 1 and 2 are provided with infrared (IR) emitting/receiving elements 3 and 4 built therein. In cases where data is transmitted from the portable electronic apparatus 1 to the other apparatus 2 and vice versa, the respective IR emitting/receiving elements 3 and 4 of the apparatuses 1 and 2 are directed toward each other so as to make a line of sight connection between them.

However, such a conventional electronic apparatus is not easy to use in some situations. For instance, in cases where two users want to make a data communication through the IR transmission in a conference room where each user must usually be seated, the apparatuses 1 and 2 cannot transmit data to each other without changing in direction so as to direct the respective IR emitting/receiving elements 3 and 4 toward each other.

SUMMARY OF THE INVENTION

An object of the present invention is to provide a portable electronic apparatus which is easy to use infrared transmissions.

Another object of the present invention is to provide a portable electronic apparatus which enables infrared communications with another apparatus without the inconvenience of directing both the apparatuses toward each other.

According to the present invention, the housing of a portable electronic apparatus is provided with a plurality of infrared element connectors on the surfaces thereof. A detachable infrared emitting/receiving element is electrically connected to one selected from the infrared element connectors so as to provide the best infrared connection. In other words, from the infrared element connectors in different directions, a connector is selected which is directed toward the opposite apparatus. Therefore, the infrared transmission is made with the reduced inconvenience of changing the direction of the apparatuses.

DETAILED DESCRIPTION OF THE PREFERRED EMBODIMENTS

Figure 1:
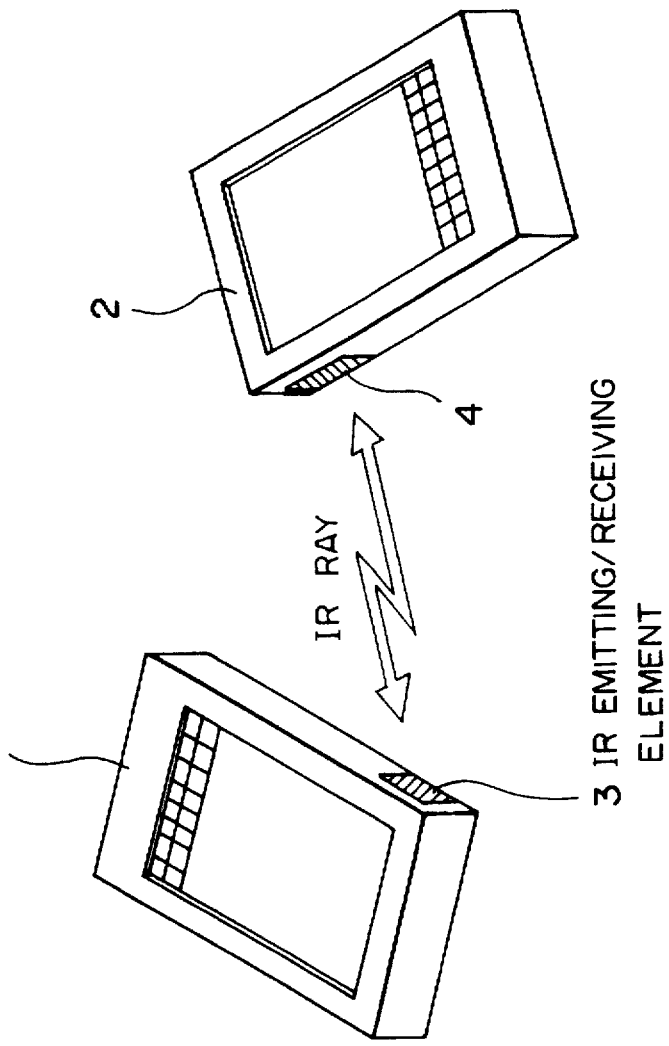
FIG. 1 is a diagram showing the infrared transmission between conventional portable electronic apparatuses.
Figure 2:
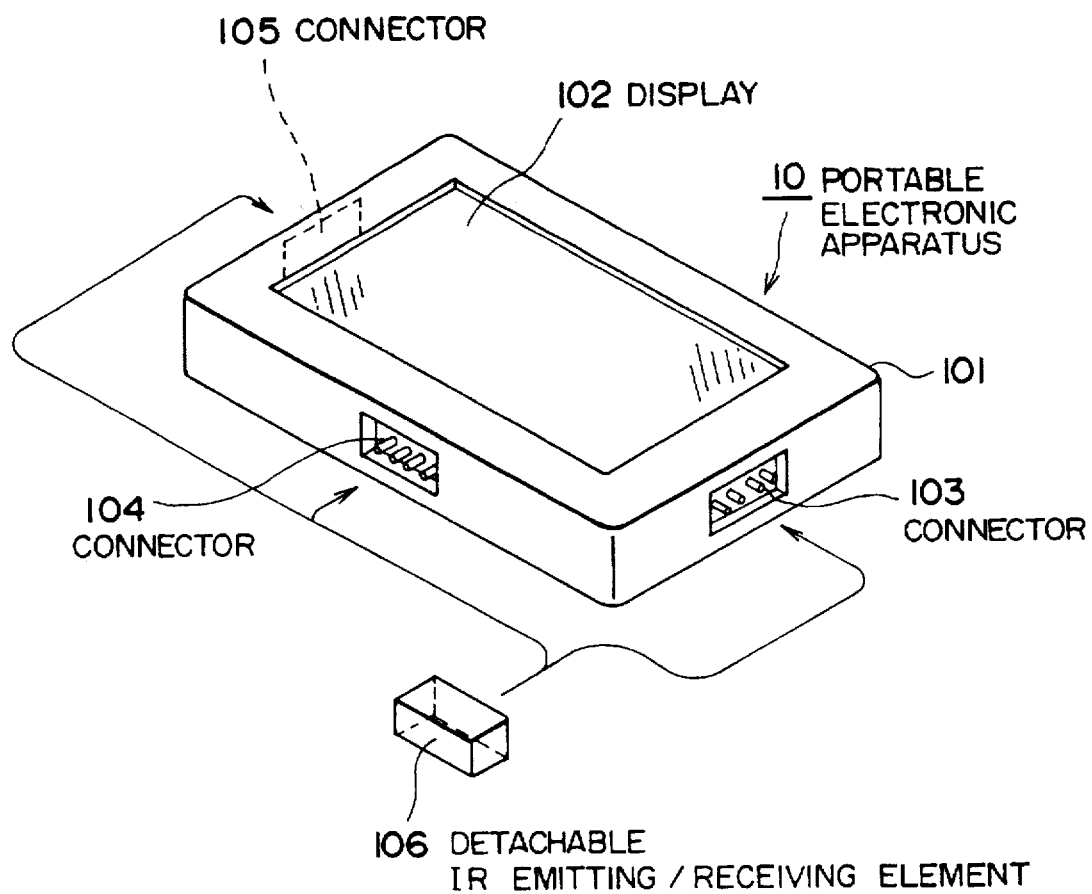
FIG. 2 is a perspective view showing a portable electronic apparatus according to an embodiment of the present invention.

Referring to FIG. 2, a portable electronic apparatus 10 according to an embodiment of the present invention is composed of a housing 101 containing integrated circuits necessary for implementing desired functions including the infrared communication function. The housing 101 has a display 102 such as a liquid crystal display (LCD) on the top surface thereof and IR element connectors or ports 103–105 on the respective sides thereof. A detachable IR emitting/receiving element 106 is inserted into a desired one of the IR element connectors 103–105 to make an electrical connection to the transmitter/receiver of the apparatus 10. The detachable IR emitting/receiving element 106 has an IR light-emitting diode (LED) and a photodiode (not shown) therein.

Figure 3:
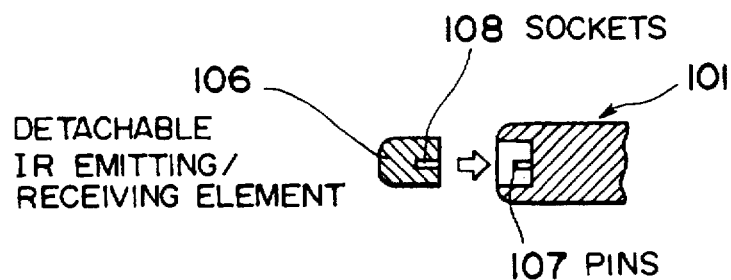
FIG. 3 is a partial sectional view of a connector portion of the portable electronic apparatus according to the embodiment.

Referring to FIG. 3, each of the IR element connectors 103–105 is a connector with two pairs of pins 107 for transmitting and receiving, respectively. The IR element connectors 103–105 are of the same construction such that a recess is formed on the side surface of the housing 101 with the pins 107 placed therein. The detachable IR emitting/receiving element 106 has a connector with two pairs of sockets 108 into which the respective pins 107 plug as indicated by an arrow in FIG. 3. The two pairs of sockets 108 are electrically connected to the IR light-emitting diode and the photodiode, respectively. Since the IR element connectors 103–105 are of the same construction, the detachable IR emitting/receiving element 106 can be attached to a desired one of the IR element connectors 103–105. In other words, according to this embodiment, the infrared transmission can be made in three directions by inserting the detachable IR emitting/receiving element 106 into one of the IR element connectors 103–105 without changing the direction of the apparatus 10. Needless to say, in cases where the four sides of the housing 101 are provided with four IR element connectors of the same construction, respectively, four-direction IR transmission may be achieved.

Figure 4:
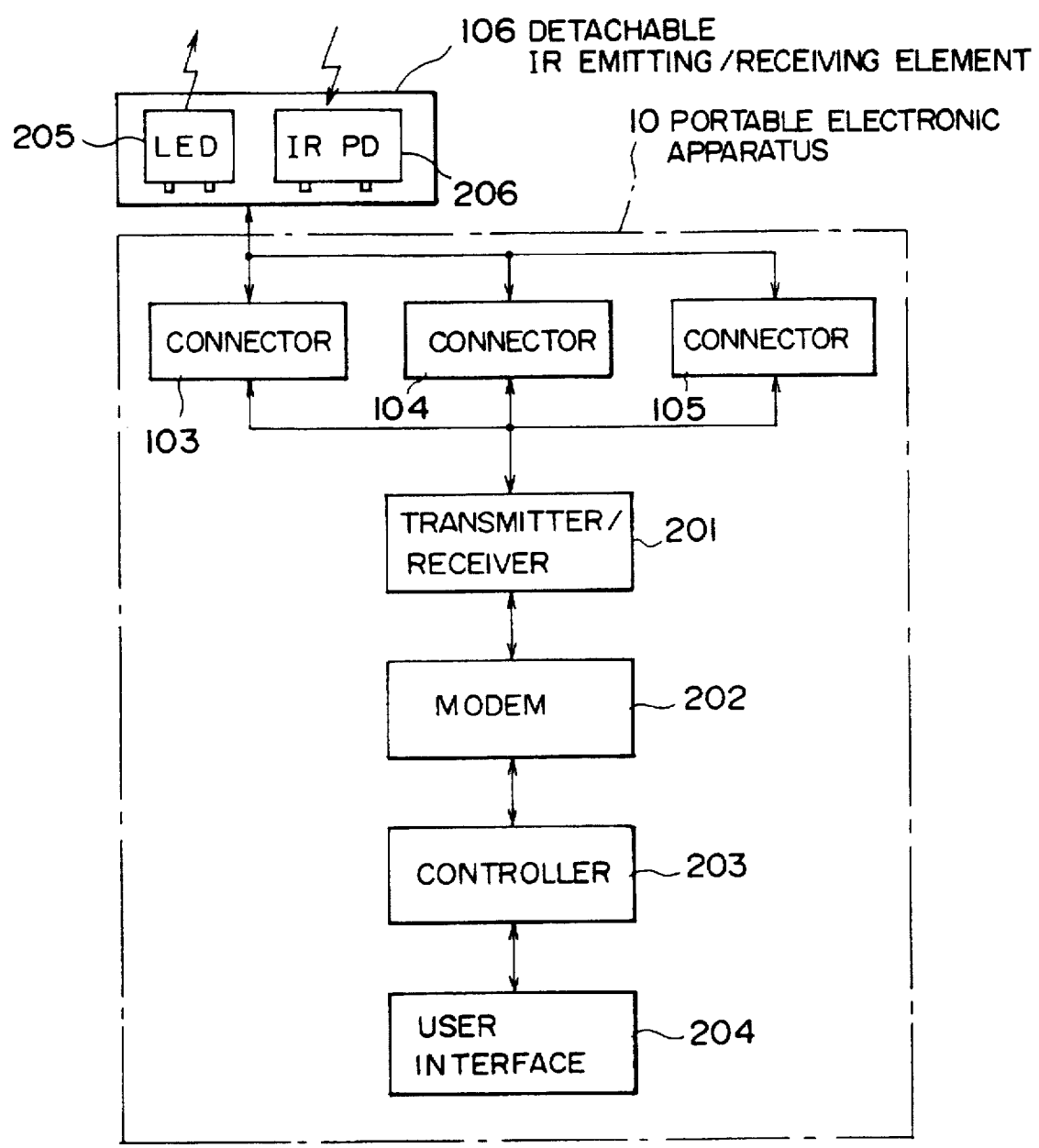
FIG. 4 is a block diagram showing a schematic internal circuit of the portable electronic apparatus according to the embodiment.

Referring to FIG. 4, the apparatus 10 includes the following circuits necessary for IR communication. A transmitter/receiver 201 is electrically connected in common to the respective IR element connectors 103–105, each of which is capable of sending transmitting signals to the detachable IR emitting/receiving element 106 and receiving signals from the same. When receiving a signal from one of the IR element connectors 103–105, the transmitter/receiver 201 sends the received signal to a modulator/demodulator (MODEM) 202 where the received signal is demodulated. The demodulated signal is processed under control of a controller 203 and then transferred to a user interface 204 including a graphical user interface displayed on the display 102. When transferring a signal to the detachable IR emitting/receiving element 106, the controller 203 controls the user interface 204 such that the user can inputs instructions and transmitting data through the user interface 204. According to the instructions, the controller 203 processes the data, which is then modulated by the modem 202. The modulated signal is transferred to all the IR element connectors 103-105. The detachable IR emitting/receiving element 106 is composed of the IR light-emitting diode (LED) 205 and the photodiode 206 and is capable of being electrically connected to a desired one of the IR element connectors 103-105. Therefore, when receiving the transmitting signal, the LED 205 of the detachable IR emitting/receiving element 106 emits an IR ray according to the transmitting signal. On the other hand, when receiving an IR ray from another apparatus, the photodiode 206 converts the IR ray into an electric signal and then transfers it to the transmitter/receiver 201 through the IR element connector into which the detachable IR emitting/receiving element 106 is inserted.

Figure 5:
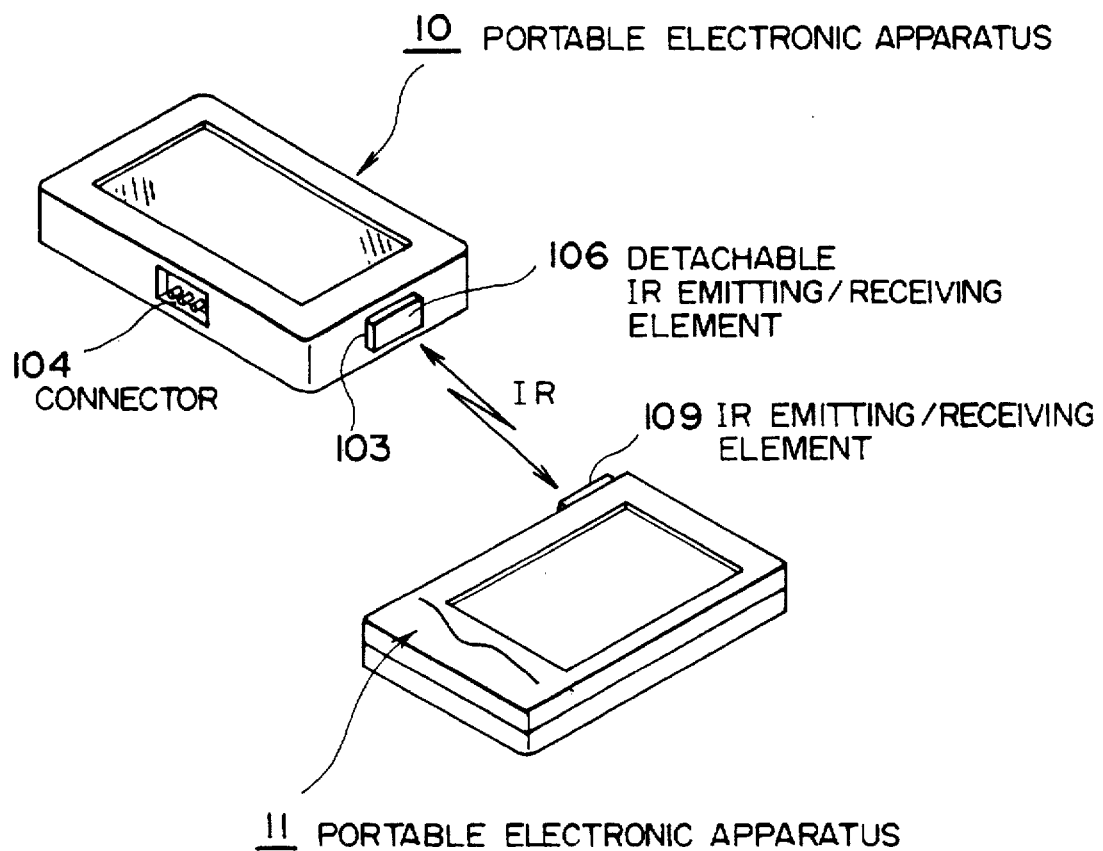
FIG. 5 is a diagram showing the infrared transmission between the portable electronic apparatuses according to the embodiment.

As illustrated in FIG. 5, assuming that the portable electronic apparatus 10 makes an IR data communication with another portable electronic apparatus 11 having the IR emitting/receiving element 109 directed toward the portable electronic apparatus 10. Therefore, the user of the apparatus 10 attaches the detachable IR emitting/receiving element 106 to the IR element connector 103 which is directed toward the portable electronic apparatus 11, and then the IR communication is started.

As described above, the portable electronic apparatus 10 can easily provide IR communications with other apparatuses without the inconvenience of changing the direction of the apparatus 10. Further, it is preferable that each side of the apparatus housing is provided with the IR element connector.

What is claimed is:

1. A portable electronic apparatus having an infrared communication function, the apparatus comprising:

a housing containing electronic circuits including a circuit necessary for the infrared communication function;

a plurality of first connectors provided on outside surfaces of the housing, the first connectors being electrically connected to the circuit contained in the housing; and a detachable infrared element for emitting and receiving infrared rays, the detachable infrared element including a second connector which is detachably connected to any selected one of the first connectors to provide electrical connection to the circuit contained in the housing and to provided infrared communication from the outside surface of the housing having the selected first connector, and thereby the apparatus is capable of infrared communication in different directions relative to the outside surface of the housing having first connectors.

2. The apparatus according to claim 1, wherein the first connectors are provided in side surfaces of the housing, respectively.

3. The apparatus according to claim 1, wherein the housing has a box-like shape.

4. The apparatus according to claim 3, wherein the first connectors are provided in side surfaces of the housing, respectively.

5. The apparatus according to claim 1, wherein the detachable infrared element further comprises:

an infrared light-emitting device for emitting an infrared ray according to a transmitting signal received from the circuit; and an infrared detector for detecting an infrared ray and converting the infrared ray into a received signal.

6. The apparatus according to claim 5, wherein the circuit necessary for the infrared communication function comprises:

a transmitter-receiver for transmitting the transmitting signal to the first connectors and receiving the received signal from the one selected from the first connectors;

a user interface for presenting information to a user and inputting instructions and data from the user; and a controller for controlling the transmitter-receiver and the user interface so as to perform the infrared communication function.

7. The apparatus according to claim 1, wherein each of the first connectors is formed in a recess shape into which the second connector is detachably inserted.

8. The apparatus according to claim 7, wherein each of the first connectors has predetermined number of pins placed in the recess and the second connector has the predetermined number of pin holes into which the pins are inserted when the second connector is inserted into the one selected from the first connectors.

9. The apparatus according to claim 1, wherein each of the first connectors is a port for providing electrical connection to the second connector.

10. An infrared communication method between a portable electronic apparatus and an electronic apparatus which are both provided with an infrared communication capability, the method comprising the steps of:

preparing a plurality of infrared element connectors on different outside surfaces of the portable electronic apparatus;

inserting an infrared emitting-receiving element into an infrared element connector selected from the infrared element connectors to electrically connect the infrared emitting-receiving element with the portable electronic apparatus and to direct the infrared emitting-receiving element in a direction toward the electronic apparatus; and performing infrared communication with the electronic apparatus through the infrared emitting-receiving element connected to the selected infrared element connector.

* * * * *